United States Patent
Mao et al.

(10) Patent No.: US 12,438,407 B2
(45) Date of Patent: Oct. 7, 2025

(54) MOTORS WITH PRE-MANUFACTURED CONDUCTORS OR END RINGS AND MANUFACTURING METHODS THEREOF

(71) Applicant: Quantentech Limited, Grand Cayman (KY)

(72) Inventors: Hengchun Mao, Allen, TX (US); Nianjiang Li, Bad Fussing (DE); Xuezhong Jia, Allen, TX (US)

(73) Assignee: Quantentech Limited, Grand Cayman (KY)

( * ) Notice: Subject to any disclaimer, the term of this patent is extended or adjusted under 35 U.S.C. 154(b) by 165 days.

(21) Appl. No.: 18/206,024

(22) Filed: Jun. 5, 2023

(65) Prior Publication Data

US 2024/0405617 A1    Dec. 5, 2024

Related U.S. Application Data

(60) Provisional application No. 63/349,653, filed on Jun. 7, 2022.

(51) Int. Cl.
| | |
|---|---|
| *H02K 1/18* | (2006.01) |
| *H02K 1/02* | (2006.01) |
| *H02K 15/021* | (2025.01) |
| *H02K 15/085* | (2006.01) |

(52) U.S. Cl.
CPC ............. *H02K 1/18* (2013.01); *H02K 1/02* (2013.01); *H02K 15/021* (2025.01); *H02K 15/085* (2013.01)

(58) Field of Classification Search
CPC .......... H02K 1/18; H02K 15/021; H02K 1/02; H02K 15/085
USPC ..................................... 310/216.113
See application file for complete search history.

(56) References Cited

U.S. PATENT DOCUMENTS

| | | | | |
|---|---|---|---|---|
| 1,044,217 | A * | 11/1912 | McCollum | H02P 4/00 310/212 |
| 2012/0126657 | A1* | 5/2012 | Gerard | H02K 17/20 29/598 |
| 2012/0228985 | A1* | 9/2012 | Hayahi | H02K 15/023 29/598 |
| 2019/0058431 | A1* | 2/2019 | Mao | H02K 17/30 |

FOREIGN PATENT DOCUMENTS

JP        10322990 A * 12/1998

* cited by examiner

*Primary Examiner* — Jose A Gonzalez Quinones
(74) *Attorney, Agent, or Firm* — AP3 Law Firm PLLC

(57) ABSTRACT

A device includes a stator or a rotor configured to magnetically coupled through an air gap, a plurality of slots distributed along a perimeter of the stator or rotor, a plurality of metal bars each placed into one of the plurality of slots, and an end ring having plurality of openings. Each opening is configured to receive an end of one of the metal bars, and a lock feature is configured to improve a mechanical attachment between the end ring and the metal bar.

20 Claims, 16 Drawing Sheets

MOTORS WITH PRE-MANUFACTURED CONDUCTORS OR END RINGS AND MANUFACTURING METHODS THEREOF

CROSS REFERENCE TO RELATED APPLICATIONS

This application claims priority to U.S. Provisional Application No. 63/349,653, filed on Jun. 7, 2022, entitled "Motors with Pre-manufactured Conductors and End Rings and Manufacturing Methods thereof", which is herein incorporated by reference.

TECHNICAL FIELD

The present disclosure relates to a motor and/or generator, and, in particular embodiments, to innovative technologies which improve the design, construction and manufacturing of advanced motors/generators and drive systems.

BACKGROUND

An electric machine (motor or generator) is an apparatus converting energy between electric power and mechanical motion. There are different types of electric machines including induction machines, electrically excited synchronous motors, permanent magnets machines, switching reluctance machines, synchronous reluctance machines and hybrid machines. The various embodiments in this disclosure are applicable to these different types of electric machines above, which are configured as either motors or generators. Induction motors as an example are used to illustrate the innovative aspects of the present disclosure. The induction motor comprises a stator and a rotor. The stator is the stationary part and the rotor is the rotating part. The rotor may be inside the stator, outside the stator or beside the stator as in an axial field machine or a linear machine. An induction motor having a rotor inside a stator is used as an example to illustrate the innovative aspects of the present disclosure. A small air gap exists between the rotor and the stator for mechanical clearance and mechanical torque generation.

The squirrel cage inductor motor is the most common induction motor. The stator of the squirrel cage inductor motor comprises a plurality of windings, consisting of conductors usually embedded in a plurality of slots, which are cutouts distributed along a perimeter of the stator. The slots are optional, and the stator may be slotless and/or coreless. The rotor of the squirrel cage induction motor comprises a shaft and a squirrel cage made of metal bars contained in a magnetic structure such as a laminated silicon steel stack. The shaft is surrounded by the metal bars. First ends of the metal bars are connected by a first interconnect ring. Second ends of the metal bars are connected by a second interconnect ring.

In operation, electric power is usually applied to the stator. As a result, a first magnetic field is created in the stator and in the air gap. The first magnetic field rotates in time at a synchronous speed with alternating current (ac) power applied to the stator windings. The first magnetic field induces electric currents in the metal bars of the rotor. The induced current produces a second magnetic field in the rotor. The second magnetic field of the rotor reacts against the first magnetic field of the stator. According to Lenz's Law, the rotor follows the rotating first magnetic field and generates a mechanical torque pulling the rotor into rotation. In a motor mode, the rotor will fall behind the first magnetic field. The speed difference between the first magnetic field and the rotor keeps inducing the electric current inside the rotor. If a load is applied to the rotor and the rotor falls further behind the first magnetic field, more torque will be developed due to the lag between the rotor and the first magnetic field. In other words, the torque of the motor is approximately proportional to the slip between the speed of the rotor and the speed of the first magnetic field.

As energy efficiency becomes an increasingly important issue, more motors and generators are coupled to power electronics equipment in variable speed applications, such as industrial drives, electrical vehicles, diesel-generator sets, servo systems, and wind power generation. Many of these applications require the motors and generators to operate over a wide speed and power range, and traditional technologies cannot satisfy the performance and cost requirements for such applications. Especially, there is a need for having a motor and/or generator which has a low material and manufacturing cost and can operate efficiently over a wide speed and power range, which presents challenges to the system design of the motor.

It would be desirable to have a high performance motor exhibiting good behaviors such as high efficiency over a variety of speed and power range conditions at a low cost.

SUMMARY

These and other problems are generally solved or circumvented, and technical advantages are generally achieved, by preferred embodiments of the present disclosure which provide a motor having metal bars or sheet conductors and ending rings, and the conductors and the metal bars are manufactured into a reliable winding system or squirrel cage at a low cost. In particular, the material of the conductors inside the slots may be different from the material of an end ring. For example, the conductors may be copper bars or copper sheets, and the end ring may be made of aluminum. The use of different materials in conductors and end rings may have advantages in weight, cooling and cost.

According to an embodiment of the present disclosure, a device includes a stator or a rotor configured to be magnetically coupled through an air gap, a plurality of slots distributed along a perimeter of the stator or the rotor, a plurality of metal bars each placed into one of the plurality of slots, and an end ring having plurality of openings. Each opening is configured to receive an end of one of the metal bars, and a lock feature is configured to secure a mechanical attachment between the end ring and the metal bar.

According to another embodiment of the present disclosure, a method includes configuring a stator or a rotor configured to be magnetically coupled through an air gap, placing a plurality of slots distributed along a perimeter of the stator or the rotor, inserting a plurality of metal bars into the plurality of slots, and configuring an end ring having plurality of openings, each configured to receive an end of one of the metal bars, wherein a lock feature is configured to secure a mechanical attachment between the end ring and the metal bar.

According to yet another embodiment of the present disclosure, an apparatus includes a stator magnetically coupled to a rotor through an air gap, a plurality of slots distributed along a perimeter of the apparatus and configured to accommodate a plurality of conductors with each of the slots configured to accommodate one of the conductors, and an end ring having a plurality of openings, with each opening configured to receive an end of one of the conductors. The apparatus also has a lock feature configured to improve a mechanical attachment between the end ring and the conductor.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an inductor motor. There are different types of electric machines, and the various embodiments in this disclosure are applicable to other electric machines. For example, a dynamically reconfigurable motor (DR Motor), which improves the traditional motor technology by dynamically changing the number of poles and/or the number of phases through various power electronics control mechanisms, may use the inventions in this disclosure to improve the design and manufacturing of its stator or rotor windings. Hereinafter, various embodiments will be explained in detail with reference to the accompanying drawings.

This disclosure presents further improvements in motor/generator design and manufacturing processes. Although the discussion uses a motor as an example, the same principles can be applicable to generators.

Figure 1:
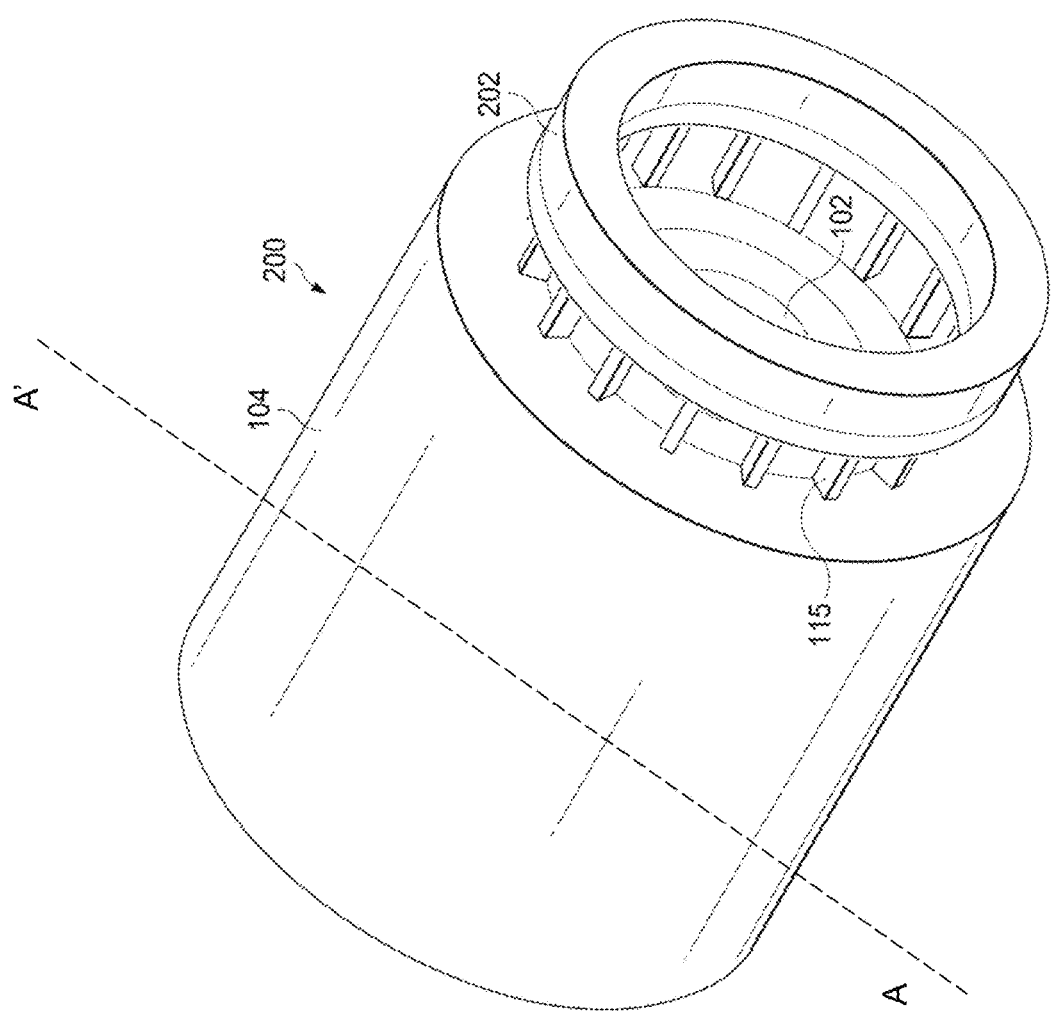
FIG. 1 illustrates a perspective view of a motor in accordance with various embodiments of the present disclosure.

FIG. 1 illustrates a perspective view of a motor in accordance with various embodiments of the present disclosure. The motor 200 comprises a rotor 102 and a stator 104. The rotor 102 is inside and surrounded by the stator 104. The stator 104 comprises a stator core, a plurality of stator windings and a connection ring 202. A connection ring is also alternatively referred as an end ring, and in a motor there may be multiple end rings. A winding comprises a plurality of conductors (e.g., conductor 115) embedded in one or more slots distributed along a perimeter in the stator core, and a slot may contain one or more conductors. Some or all of stator windings are connected together by one or more end rings, such as the connection ring 202 as shown in FIG. 1. A motor may have more than one connection rings at one end or both ends. The stator core is made of suitable magnetic materials. The stator core is able to conduct magnetic flux and provide mechanical support for the plurality of stator windings. In this disclosure, the terms of stator winding, phase winding and conductor are usually interchangeable and usually have the same meaning. Depending on the construction of the motor, a winding or conductor may be located in the rotor also, although the following discussion will generally use such windings in the stator as examples.

Figure 2:
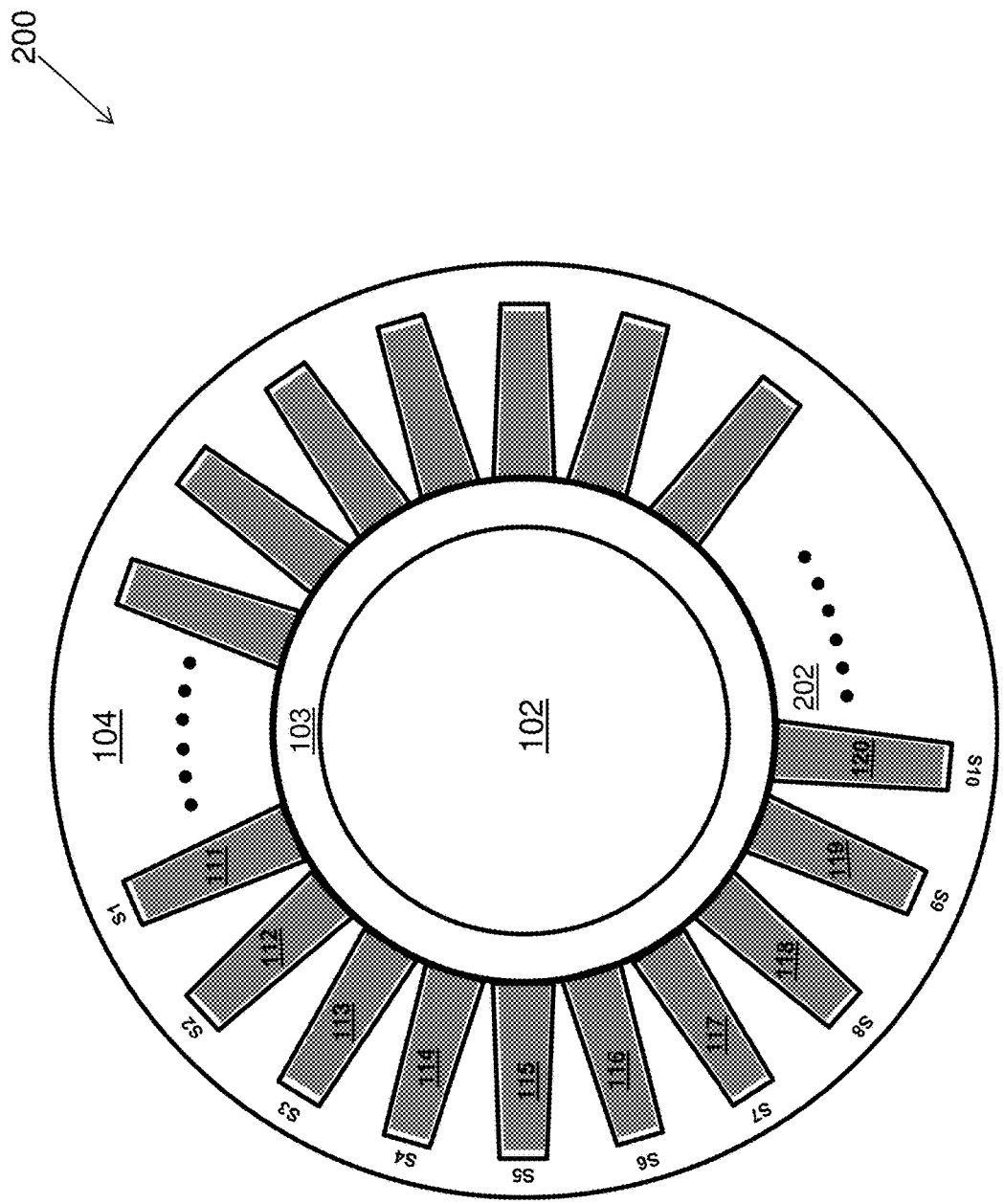
FIG. 2 illustrates a simplified cross section view of the motor shown in FIG. 1 showing details of the stator in accordance with various embodiments of the present disclosure.

FIG. 2 illustrates a simplified cross section view of the motor cut through line A-A' shown in FIG. 1 in accordance with various embodiments of the present disclosure. The motor 200 comprises a rotor 102, a stator 104 and a plurality of conductors formed in the stator 104. As shown in FIG. 2, there is an air gap 103 formed between the rotor 102 and the stator 104. A plurality of slots, for example S1-S10, is formed in the stator 104. Each slot (e.g., slot S1) is employed to accommodate one or more conductors which forms a conductor group, labeled as 111-120 in the figure. In the description of this closure, one conductor is shown in a slot, as exemplified by 115 in FIG. 1. It should be noted, depending on different designs, more conductors may be embedded in one slot, and multiple conductors in different slots may be connected in series and/or in parallel, forming one or more turns of a winding.

It should be recognized that while FIG. 2 illustrates the motor 200 with few slots and stator windings, the motor 200 could accommodate any number of slots and stator windings. The slots are generally evenly distributed along a perimeter of the motor, and are labeled consecutively.

As shown in FIG. 1, a connection ring (or end ring) 202 may be used to connect conductors and windings together. It is shown as circular in shape. It should further be noted that the shape of the ring 202 is merely an example. One of ordinary skill in the art would recognize many variations, alternatives, and modifications. For example, it is within the scope and spirit of the disclosure for the ring 202 to comprise other shapes, such as, but not limited to, oval, square or rectangle. The ring may not be in a closed shape. Throughout the description, the ring may be alternatively referred to as a connection ring or a connection bar.

Figure 3:
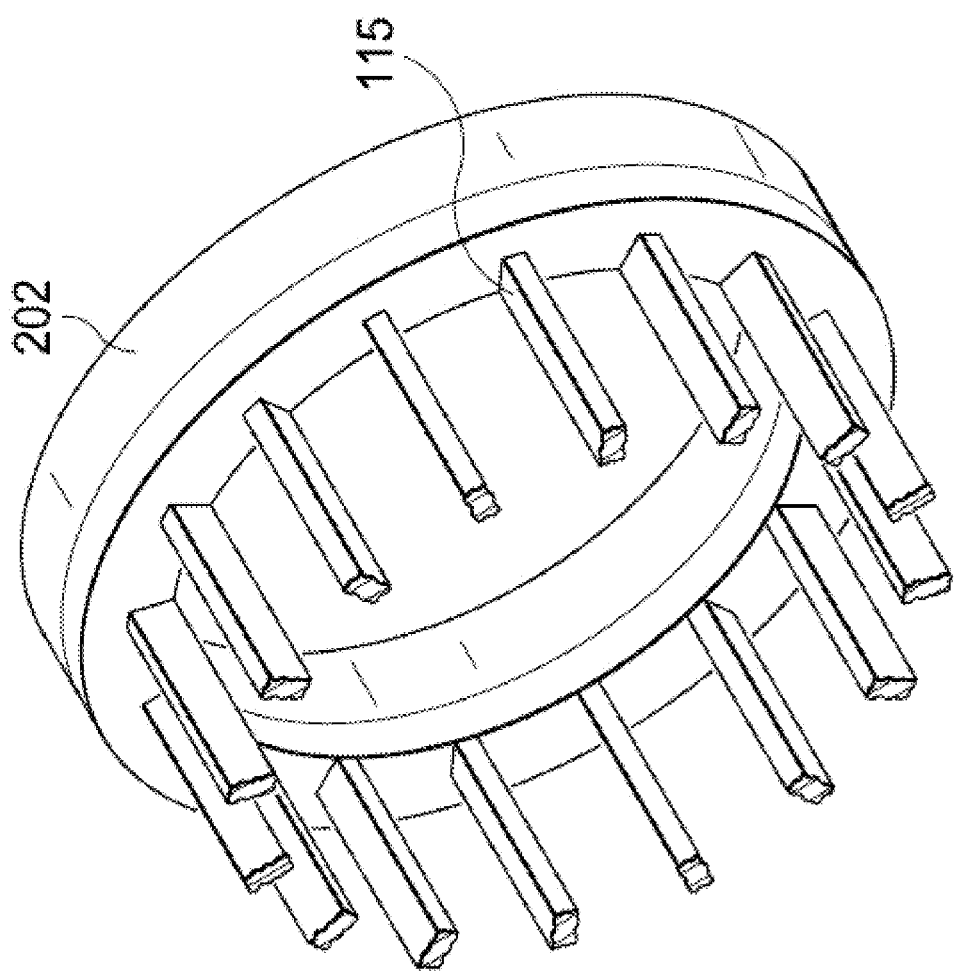
FIG. 3 illustrates a perspective view of the connection ring and the plurality of windings of the motor shown in FIG. 2 in accordance with various embodiments of the present disclosure.

FIG. 3 illustrates a perspective view of the connection ring and the plurality of conductors/windings of the motor shown in FIG. 2 connected together in accordance with various embodiments of the present disclosure. The connection ring 202 is circular in shape. One end of each stator winding (e.g., stator winding 115) is connected to the connection ring 202. The other end of some or all of the stator windings may be connected to another ring similarly. Since the connection ring 202 is formed of a conductive material, the plurality of stator windings is electrically connected to each other. In the manufacturing process, a conductor may be inserted into a slot of a motor as a component. Alternatively, the conductor may be manufactured into the slot through suitable processes such as molding, casting, plating or printing processes using a conductive material, separately or together with other phase conductors. The end ring may be manufactured together with the conductors, or separately and then connected to the phase windings afterwards.

Figure 4:
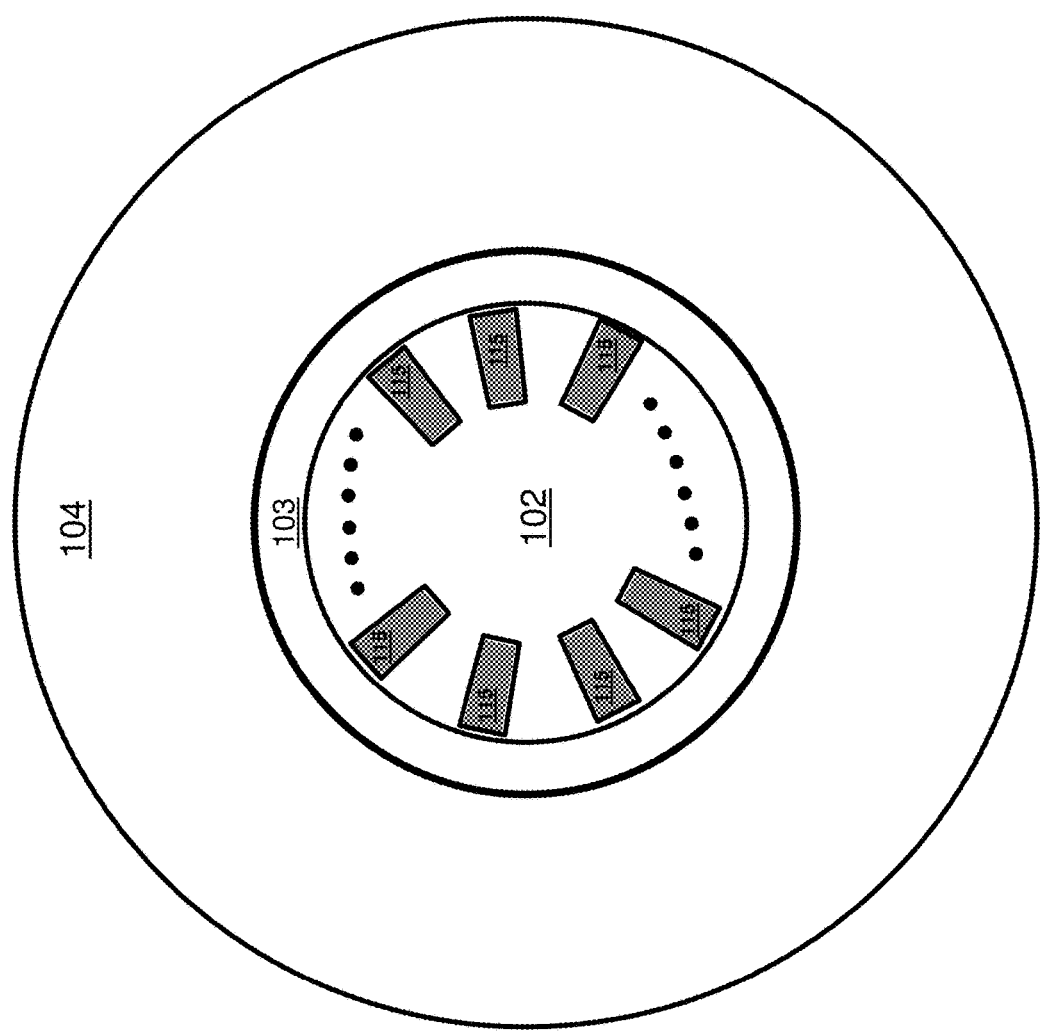
FIG. 4 illustrates a cross section view of the motor shown in FIG. 2 showing details of the rotor in accordance with various embodiments of the present disclosure.

FIG. 4 is a cross-view similar to FIG. 2 but shown more details of the rotor. The conductor and winding arrangements of the rotor are similar to those of the stator, and the conductor/winding in slots may be connected together by connection rings on one end or both end of the rotor. For example, in a squirrel-cage rotor, usually one conductor is embedded in a slot, and all rotor conductors are connected to an end ring on both ends. The connection rings and conductors are similar to what are shown in FIGS. 1 and 3.

As is shown in FIGS. 2 and 4, the rotor or the stator, or both, of a motor may have a plurality of conductors mechanically coupled to a plurality of connection rings. The design and manufacturing of the conductors and the connection rings are important for realizing a high performance and cost effective motor. A squirrel-cage rotor, with a metal bar rotor conductor in each slot, and each end of the rotor conductors shorted by an end ring respectively, will be used to illustrate the inventive aspects of this disclosure in following discussion. Such techniques can also be used for stators, or rotors and stators with more conductors in a slot, and/or with more connector rings.

Figure 5:
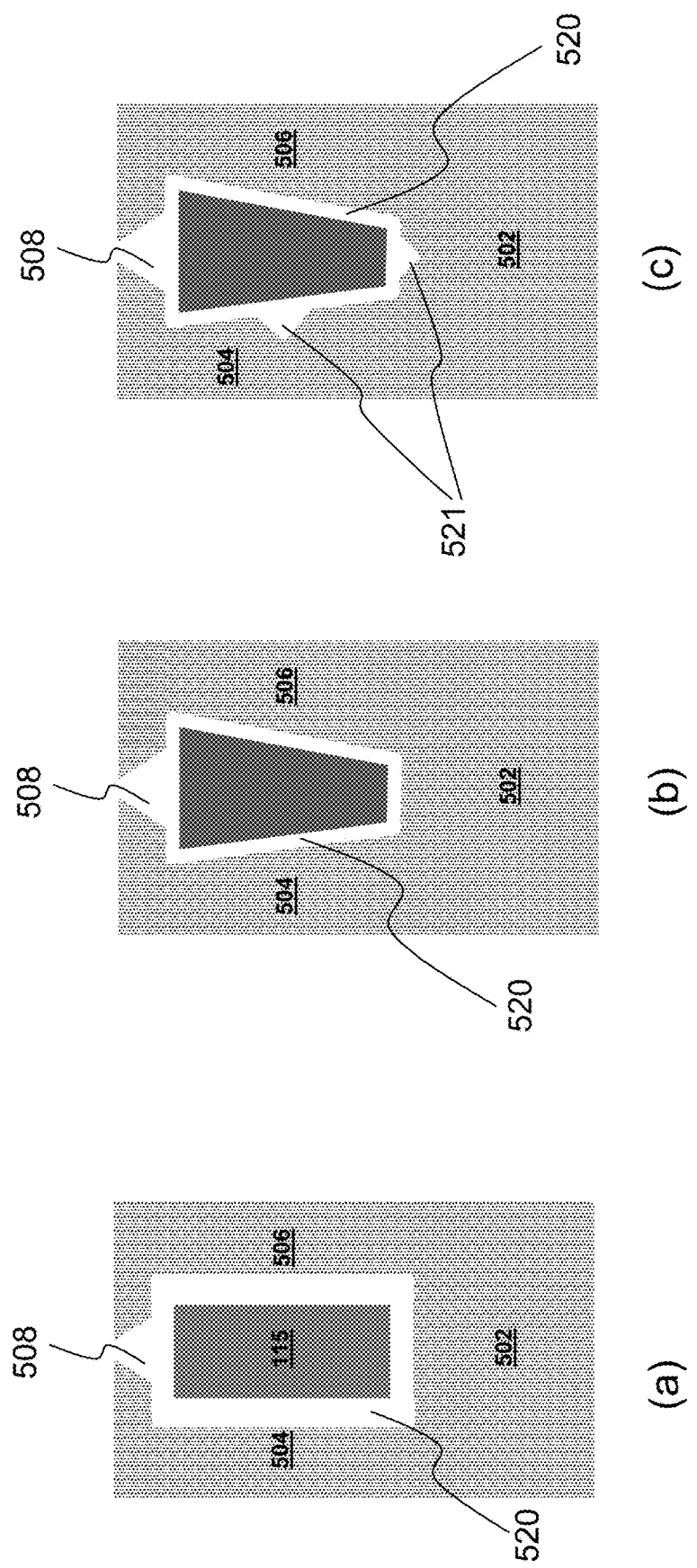
FIG. 5 illustrates a cross sectional view of an area around a slot taken along line A-A' in FIG. 1 in accordance with various embodiments of the present disclosure.

FIG. 5 illustrates cross sectional views of a rotor conductor 115 embedded in a slot in accordance with various embodiments of the present disclosure. 502 and 504 are two adjacent teeth of the core, and 502 is the yoke area of the core. The slot is a cutout (or empty space) of the core, and formed between teeth 504 and 506, and yoke 502. Around the conductor 115, an interface material 520 may be optionally coated to the conductor or the walls of the slot, or placed between the walls of the slot and the surface of the conductor. The structures shown in FIG. 5 may be used for both stators and rotors. In stators there is significant voltage between windings, the optional interface material 520 may be dielectric material such as insulation paper, tape, or a coating which can withstand enough voltage. In rotors where neighboring conductors are shorted, the interface materials may be electrically and thermally conductive materials which can easily fill the gap between the conductor and the walls of the slot, such as a solder consisting of tin, zinc or other suitable materials or compounds, or aluminum which can be casted around the conductor 115. The interface material 520 may provide mechanical support and cooling for the conductors. Please note that the slot may have an opening 508 facing the airgap. The opening may be filled with a suitable interface material which may be the same as or be different from the interface material 520. Alternatively, there may be no opening, i.e. the slot may be closed. In FIG. 5(a), a square conductor is shown. However, any shape can be used for the conductor, as well as the slot to accommodate the conductor. As an example, FIG. 5(b) shows a trapezoidal conductor. If it is desired to have better mechanical attachment between the conductor and the core, in some areas on the walls of the slot there may be one or more attaching features 521 included, as is shown in FIG. 5(c). An attaching feature is a small cut out on along the walls of the core so that the interface material may be better filled around it, and/or the conductor may be shaped to have a small tooth to protrude into it, so that there is better mechanical attachment between the conductor and the core of the motor, which may be important for high speed motors.

The yoke area 502 and the teeth areas 504 and 506 may be manufactured as a single part. Alternatively, they may be manufactured as separate parts and then assembled together. If the teeth 504, 506 or the upper portions of the teeth 504, and 506 are manufactured as separate parts from the yoke 502, the conductor 115 may be attached to the yoke 502 before the teeth 504, 506 or the upper portions of the teeth 504 and 506 are assembled. The conductors (windings) may be premanufactured as an assembly through processes like casting, protrusion, molding, soldering, welding and the like.

Figure 6:
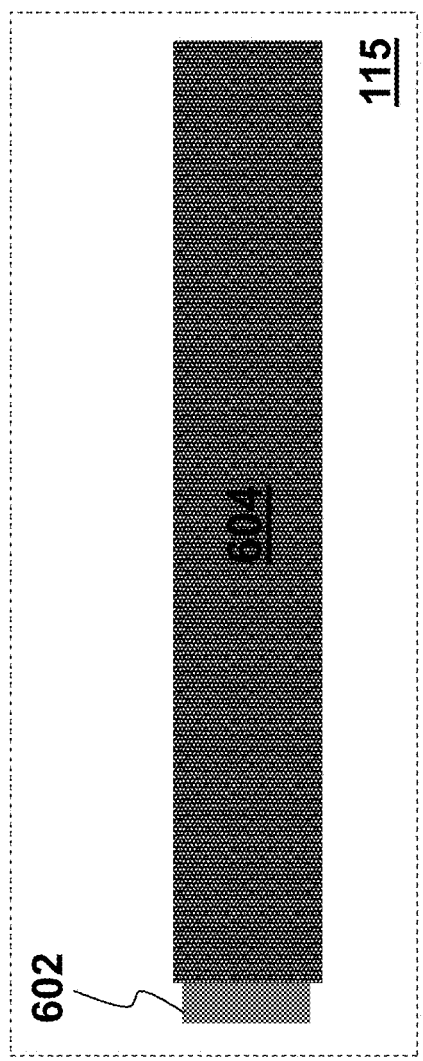
FIG. 6 illustrates a detailed view of a conductor in accordance with various embodiments of the present disclosure.

In some embodiments, the core can be manufactured from silicon steel sheets with the right pattern stamped or cut to form the teeth 504, 506 and yoke 502. Traditionally, the conductors/windings can then be manufactured by casting or molding together with the end rings after the rotor core has been formed. In alternative embodiments, the conductors may be premanufactured into a right shape such as a bar or a sheet, and are then inserted into the slots. After that, the conductors can be connected with the end rings through suitable processes such as welding. The conductors may be made of a highly conductive metal such as aluminum or coper. Increasingly, in pursuit of high efficiency and higher power density, copper conductors are increasingly used in the rotor of induction motors. As the casting temperature of copper is above 1000 C, and can degrade the performance of the magnetic material and insulative surface of the core, premanufactured conductors are sometimes more desired. FIG. 6 shows such a conductor as an example. The conductor 115 has a base conductor 602 and an optionally coating 604 on part or all of the surface of base conductor 602. The coating 604 may be a thin layer, a paper tape, or other construction of suitable material used for different reasons, such as electric insulation, thermal conduction, anti-corrosion, and a combination thereof.

In some embodiments, the conductors connected to the connection ring 202 may be inserted into an opening of the connection ring 202. Alternatively, the end of the conductors connected to the connection ring 202 may be connected to the top surface or protruding regions of the connection ring 202. The plurality of stator windings may be connected to the connection ring 202 through various processes such as welding, soldering and the like. The details of the connection will be described below with respect to FIG. 9.

The stator winding 115 comprises a metal bar 602, and optionally an insulation layer 604 may be formed over the middle portion of the metal bar 602 which is embedded in a slot. The metal bar 602 may be formed of any suitable conductive materials such as aluminum, silver, copper, any combinations thereof and the like. There may be a variety of processes to form the insulation layer 604 with a suitable insulation material. In some embodiments, an oxidation process is applied to the metal bar and an oxidized layer is formed. The oxidized layer may be an insulation layer. During the oxidation process, the areas to be used for the electrical connection may be protected from being oxidized.

The insulation layer may also provide a good thermal conduction path so that heat can be transferred between the stator winding and the magnetic material adjacent to the stator winding.

Figure 7:
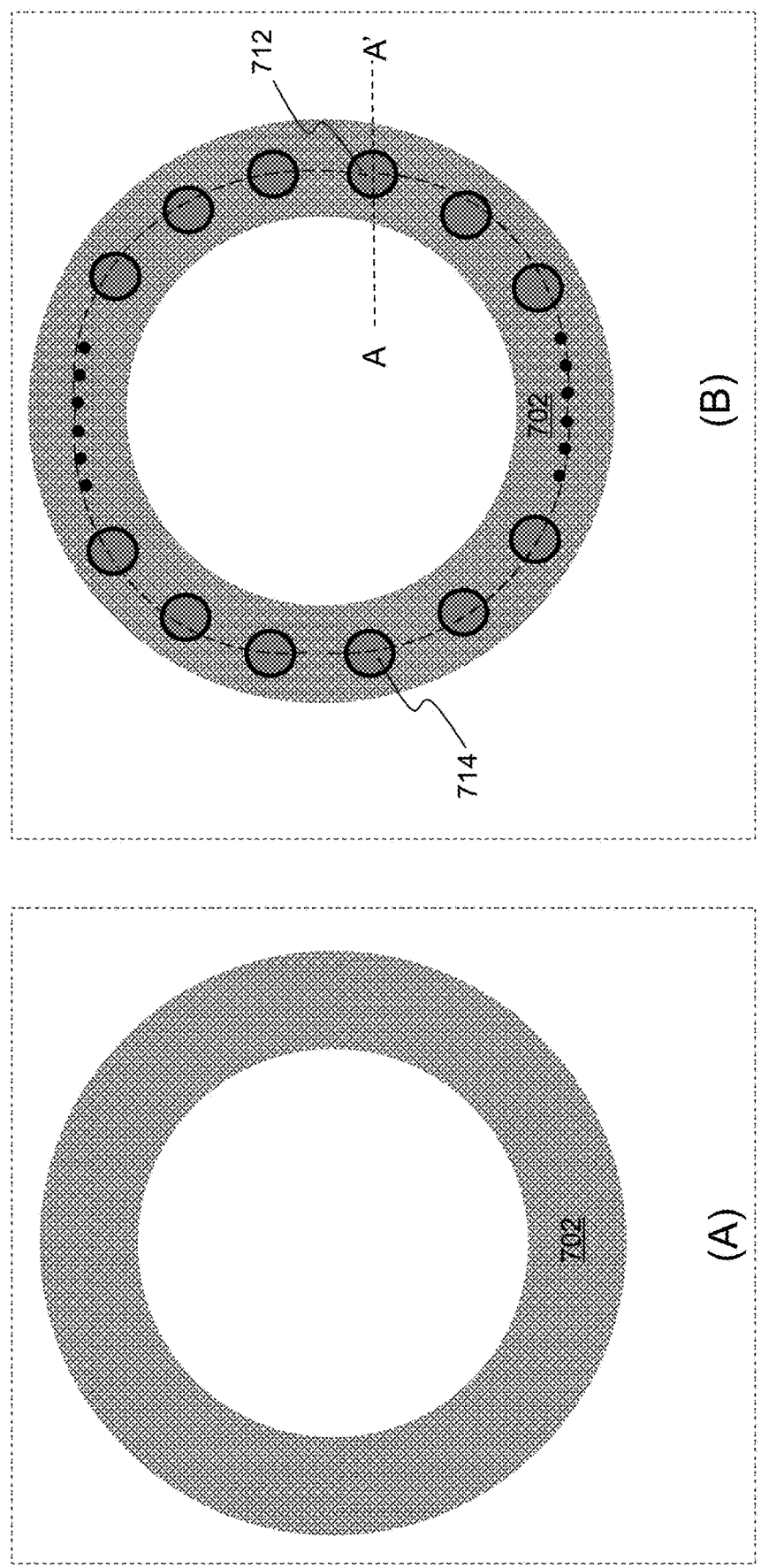
FIG. 7 illustrates side views of a connection ring in accordance with various embodiments of the present disclosure.

FIG. 7 illustrates side views of the connection ring in accordance with various embodiments of the present disclosure. FIG. 7 includes FIG. 7(A) and FIG. 7(B). FIG. 7(A) shows a connection ring 702, which is similar to the connection 202 shown in FIG. 1. FIG. 7(B) illustrates a plurality of openings formed in the connection ring 702. Throughout the description, FIG. 7(A) and FIG. 7(B) may be collectively referred to as FIG. 7.

The connection ring 702 is formed of a conductive material such as aluminum or copper. The material used for the connection ring 702 may be the same as or different from the material of the conductors 115. For example, the conductor 115 may be made of copper while the connection ring may be made of aluminum, or the conductor 115 may be made of aluminum while the connection ring may be made of copper. The resulting advantage is that copper may be used to improve current conduction and reduce size when necessary, and aluminum is used to reduce weight, and process complexity and cost of manufacturing. The connection ring 702 may comprise a plurality of openings for accommodating the conductors 115, and each opening works as a connecting port to accommodate an end of a conductor 115. As shown in FIG. 7(B), the connection ring 702 comprises many openings such as openings 712 and 714. The openings 712 and 714 may be circular in shape, or any other shape suitable for the mechanical coupling to the conductors 115. The openings may be evenly spaced in the connection ring 702 as shown in FIG. 7(B). It should be noted that the shape of the openings shown is merely an example. One of ordinary skill in the art would recognize many variations, alternatives, and modifications. For example, it is within the scope and spirit of the disclosure for the openings to comprise other shapes, such as, but not limited to oval, square or rectangle. Furthermore, depending on different applications and design needs, the openings may be not evenly spaced.

Figure 8:
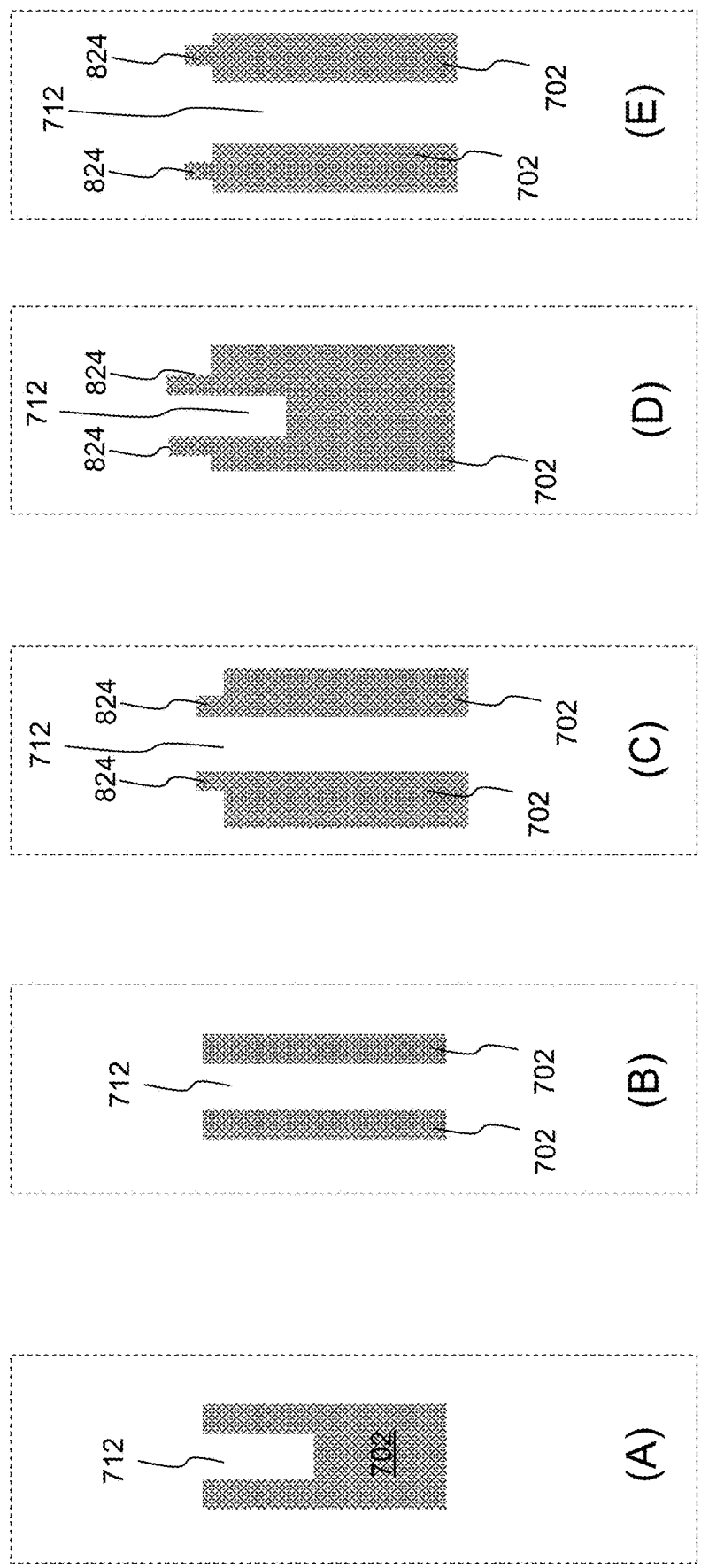
FIG. 8 illustrates cross sectional views of the connection ring taken along line A-A' in FIG. 7 in accordance with various embodiments of the present disclosure.

The detailed connection between the connection ring 702 and the conductors will be described below with respect to FIG. 8. FIG. 8 illustrates cross sectional views of the connection ring taken along line A-A' in FIG. 7 in accordance with various embodiments of the present disclosure. FIG. 8 includes FIGS. 8(A)-8(E), which may be collectively referred to as FIG. 8 throughout the description. FIG. 8 illustrates various embodiments of the opening of the connection ring.

The connection ring 702 has an opening 712. The opening 712 is employed to accommodate a conductor 115. In particular, one end of the conductor 115 may be inserted into the opening. A suitable process such as welding or soldering may be used to secure the attachment of the conductors to the connection ring.

As shown in FIG. 8(A), the opening 712 may extend partially through the connection ring 702. Then, the opening 712 is a blind-hole opening. As shown in FIG. 8(B), the opening 712 may extend through the connection ring 702. In other words, the opening 712 is a through-hole opening.

In FIG. 8(C), one side of the connection ring 702 has a protruding region 824. The through-hole opening 712 extends through the protruding region 824 as well as the connection ring 702. In FIG. 8(D), one side of the connection ring 702 has a protruding region 824. The opening 712 extends partially through the connection ring 702. In FIG. 8(E), the opening is smaller in the main body of the connection ring 702 than in the protruding region 824. The opening arrangement shown in FIG. 8(E) helps to secure the position of the conductor to be inserted in the opening. The opening arrangement shown in FIG. 8(E) may also improve the soldering process for connecting the conductors and the connection ring, as the enlarged protruding feature may allow a high quality solder joint through a reflow or wave solder process.

The protruding regions and the opening shown in FIG. 8 can both work as a connecting port to receive an end of a conductor, and may be combined in various ways. For example, it is feasible to place the protruding regions on both the top surface and the bottom surface of the connection ring 702. The use of the protruding region shown in FIG. 8 may improve the manufacturing process so as to increase the soldering quality, mechanical strength and current-carrying capability of the connection. It should be noted that the depth of the openings shown in FIG. 8 is merely an example. Depending on different applications and design needs, the depth of the openings may vary accordingly.

In some embodiments, before or after inserting a conductor into an opening (e.g., opening 712), a solder or welding material layer may be put at the bottom or top of the opening, or along the wall of the opening. After the conductor has been inserted into the opening, suitable processes such as a reflow soldering, hand soldering, laser soldering, wave soldering, welding and the like may be used to secure the connection between the conductor and the connection ring. A variety of solder material may be used, such as tin or zinc, and or a compound containing such materials. The solder material should be able to stand the operating temperature of the motor. However, as the reliability of a solder joint may be compromised if a mechanical force or vibration is applied to the joint, it is desirable to use mechanical lock devices to take the mechanical force and reduce the vibration along the interface material, so the solder joint can operate reliably.

Figure 9:
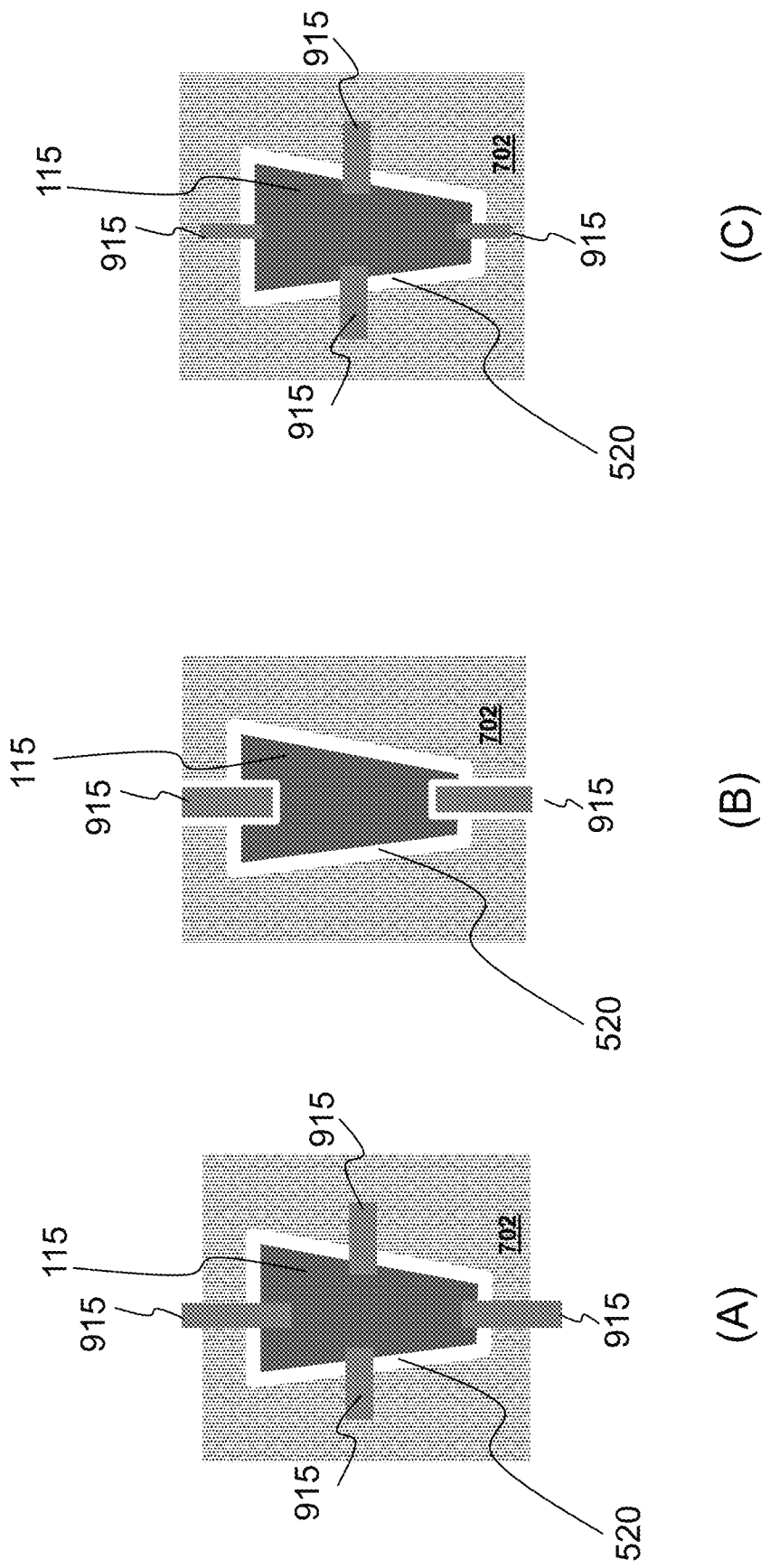
FIG. 9 illustrates side views of a connection ring with a conductor connected in accordance with various embodiments of the present disclosure.

FIG. 9 illustrates cross-section views after a conductor 115 is connected to the connection ring 702, in which lock devices 915 are incorporated to reduce mechanical force on the solder joint in accordance with various embodiments of the present disclosure. FIG. 9 includes FIGS. 9(A)-9(C). FIGS. 9(A)-9(C) illustrate various embodiments of the connection between the conductor 115 and the connection ring 702. Throughout the description, FIGS. 9(A)-9(C) may be collectively referred to as FIG. 9. As the conductor 115 and the connection ring 702 are usually made of relatively soft metal such as copper, silver and aluminum, the locking device 915 may be made of a harder material, such as steel or iron which can withstand higher mechanical forces. Depending on the design, the locking device may have suitable coating such as tin, nickel, silver, zinc or compounds such as various solder materials. The coating material and/or the material of the locking device 915 should not cause any undesirable interaction such as corrosion to the conductor 115 and the connection ring 702.

The conductors 115 may be connected to the connection ring 702 with the aid of lock devices 915 in a variety of implementations as shown in FIG. 9. In a first implementation exemplified by FIG. 9(A), the conductor 115 may be mechanically coupled to the connection ring 702 through multiple lock devices 915, some of them are inside the connection ring 702, and some of them extend out the connection ring 702. In a second implementation, as is shown in FIG. 9(B), all locking devices 915 extends out the connection ring 702. In a third implementation as shown in FIG. 9(C), all locking devices are inside the connection ring 702. The number, shape, size and location of locking devices are shown for example only, and should be determined according to system needs. If the material of the connection ring 702 (for example, aluminum) and the material of the conductor 115 (for example, copper) are different, there may be a need to separate the conductor 115 and the walls of the connection ring 702 with a suitable distance to avoid undesired metallic interaction. The locking devices 115 can be configured to work as spacers to ensure such distance is met. The interface material 520, shown as white color inside the connection ring, may be a suitable coating manufactured onto the conductor 115, or a suitable material such as solder, tin, or zinc filling the gap inside the connection ring 702 through a suitable process such as wave solder, reflow solder, hand solder, laser colder, immersing into a bath etc after the conductor 115 is inserted.

Figure 10:
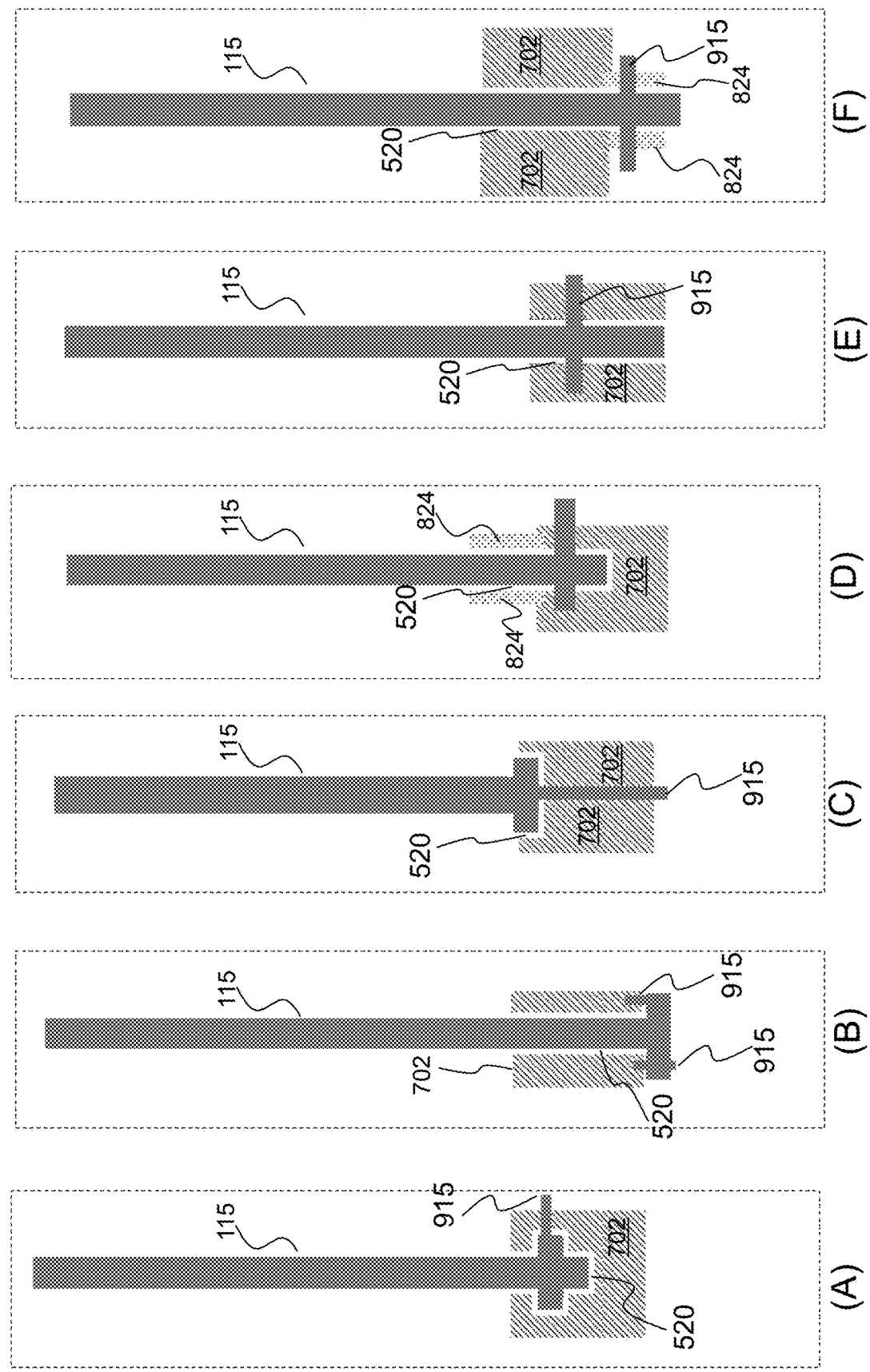
FIG. 10 illustrates cross section views of a conductor connected to an end ring in accordance with various embodiments of the present disclosure.

FIG. 10 illustrates various side views after a conductor 115 is connected to the connection ring 702 and lock devices 915 are incorporated to reduce mechanical force on the solder joint in accordance with various embodiments of the present disclosure. FIG. 10 includes FIGS. 10(A)-10(F). FIGS. 10(A)-10(F) illustrate various embodiments of the connection between the conductor 115 and the connection ring 702. Throughout the description, FIGS. 10(A)-10(F) may be collectively referred to as FIG. 10. The conductor 115 may be configured with a cross-shaped or T-shaped head as is shown in FIGS. 10(A) through 10(C), and the head can increase the attachment force between the conductor 115 and the connection ring 702 shown as shaded area. The head of the conductor 115 may be totally inside, partially outside, or totally outside the connection ring 702, as is shown respectively in FIGS. 10(A), 10(B) and 10(C). Depending on the design, the conductor 115 may not have any special head feature in the head, as shown in FIGS. 10(D) through 10(F). The connection ring 702 may have protruded area 824 shown as dotted areas to increase the attachment force to the conductor 115 and obtain other advantages. The interface material 520, shown as white areas inside the connection ring 702, may be a coating layer on the surface of the conductor 115, or a suitable material filling the gap between the conductor 115 and the connection ring 702, through various soldering or casting processes. Optionally, locking devices 915 can be utilized to help secure the mechanical connection between, form a suitable gap between, or reduce the mechanical force and vibration of the joint between the conductor 115 and connection ring 702, depending on the material and manufacturing process used.

Figure 11:
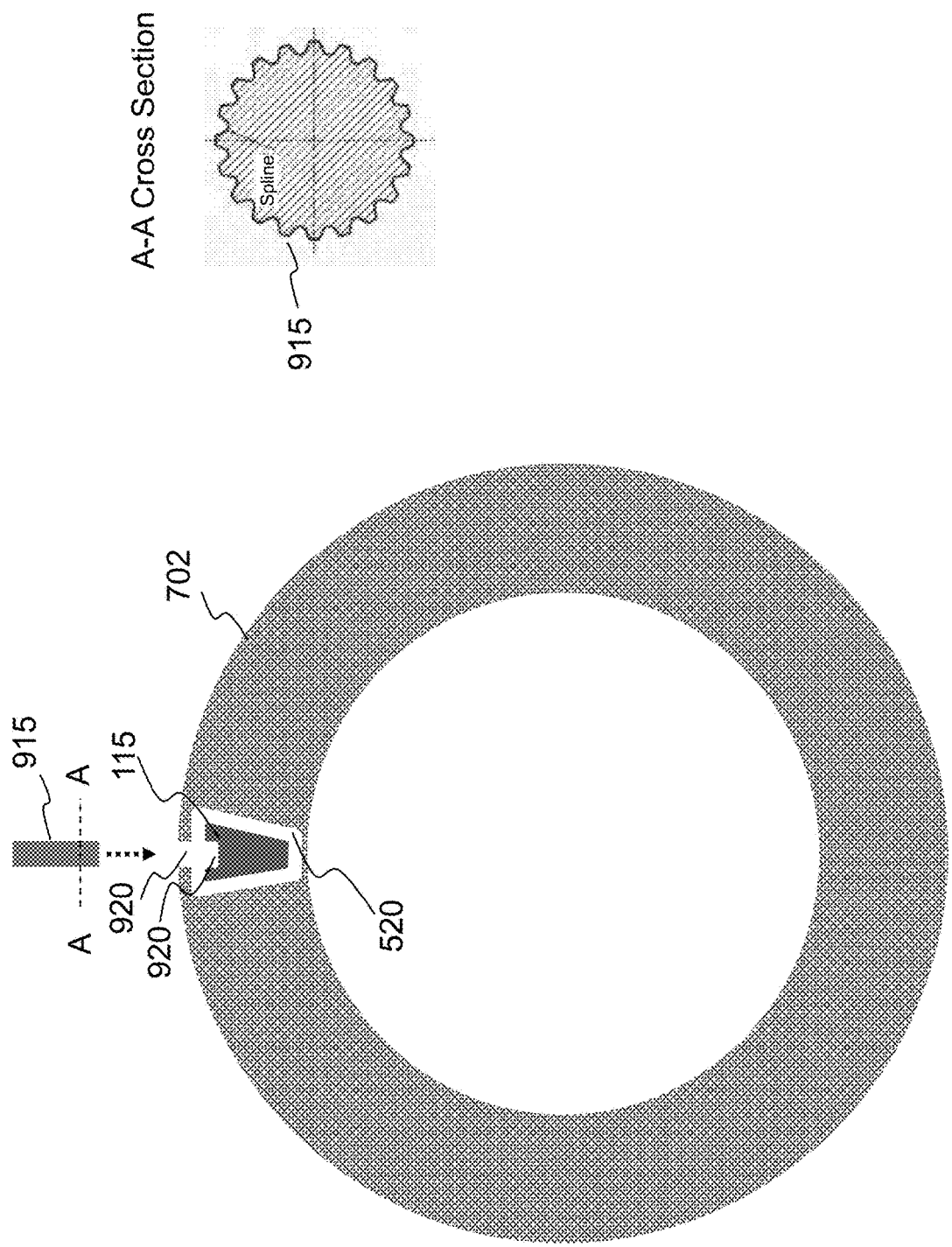
FIG. 11 illustrates a perspective view of a connection ring with a conductor and a locking device in accordance with various embodiments of the present disclosure.
Figure 12:
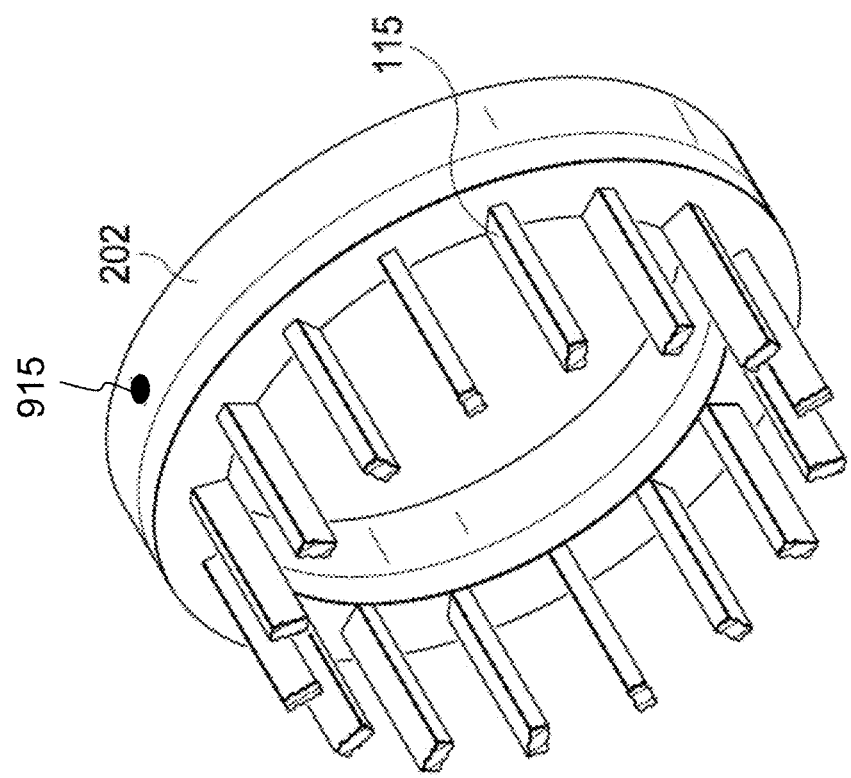
FIG. 12 illustrates a perspective view of a connector ring with a cutout for a locking device in accordance with various embodiments of the present disclosure.

FIG. 11 illustrates a simplified view of a cross section of the connection ring 702, the conductor 115, and the locking device 915. The conductor 115, and/or the connection ring 702, has an opening 920 to accommodate the locking devices 915. The locking device 915 may be manufactured as a part of the conductor 115 or the connection ring 702, or manufactured as a a separate component and then inserted or screwed into the connection ring 702 and the conductor 115. The locking device 915 may have special features such as threads, keys, and splines to enhance the interconnection. The locking device 915 may have a suitable coating to avoid undesirable metallic reaction and enhance the interconnection. As discussed earlier, the connection ring 702, the conductor 115, and the locking device 915 can be in different shapes from what are shown in the figure. Even though only one conductor and one locking device are shown in the figure, any number of conductors and locking devices can be coupled to a connection ring, FIG. 12 shows illustrates a perspective view of the connection ring and the plurality of conductors of the motor shown in FIG. 2 connected together in accordance with various embodiments of the present disclosure. The configuration in FIG. 12 is similar to the one shown in FIG. 3, except that a locking device 915 is shown in FIG. 12. As is discussed previously, the conductors 115, the connection ring 202, and the locking device 915 may have different shapes from what is shown, and the number of conductors and locking devices may be any suitable value. A conductor 115 may have any number of locking devices 915 coupled to it at various locations.

Figure 13:
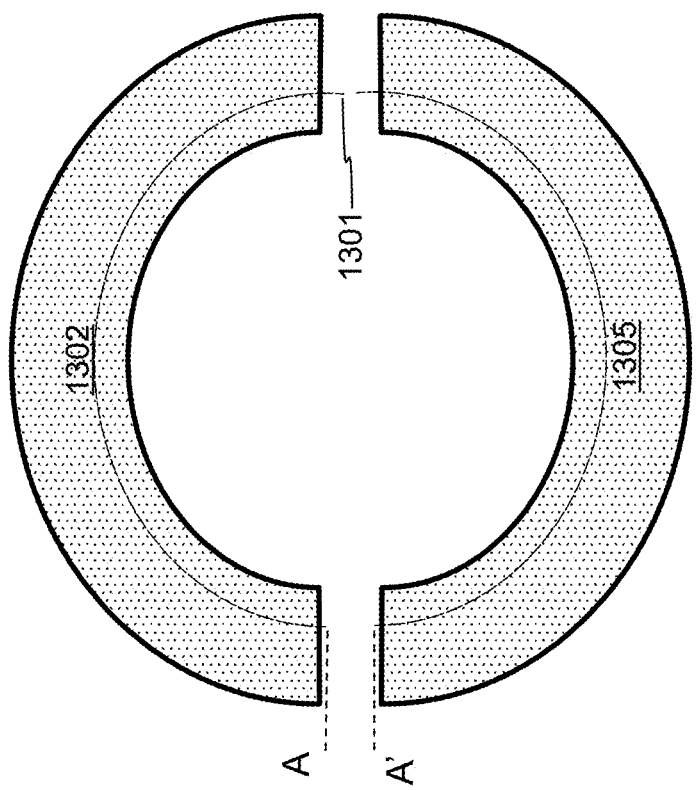
FIG. 13 illustrates multiple connection rings in accordance with various embodiments of the present disclosure.

FIG. 13 illustrates a perspective view of two connection rings coupled together in accordance with various embodiments of the present disclosure, as an example of multi-connection ring configurations. The connection rings 1302 and 1305 are made of a conductive material as separate components, but they may be coupled together through a thermal means such as cooling feature 1301. The number, shape and coupling of connection rings in a system may change according to design requirements.

Figure 14:
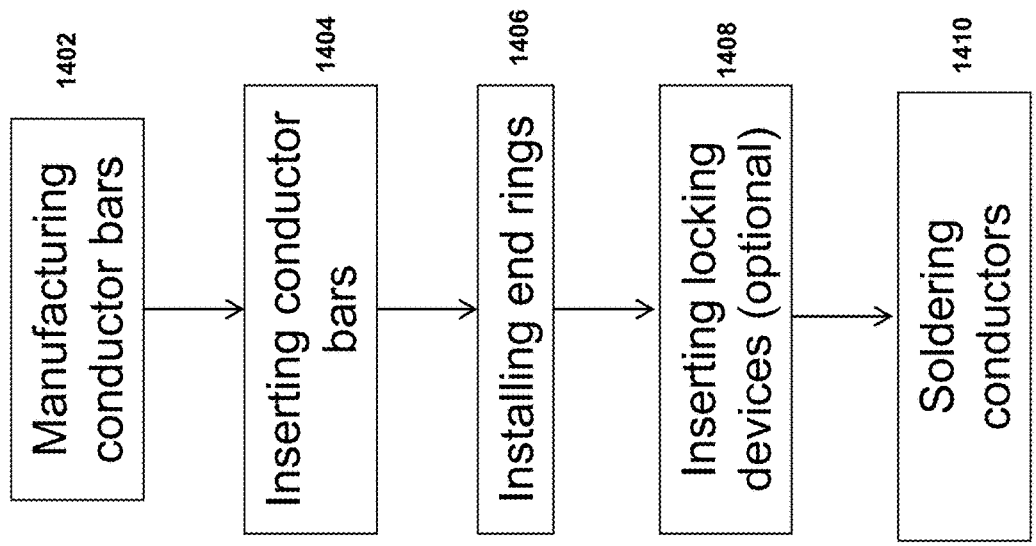
FIG. 14 illustrates a simplified manufacturing process of soldering conductors to connection raings in accordance with various embodiments of the present disclosure.

FIG. 14 illustrates a manufacturing process in accordance with various embodiments of the present disclosure. At first, conductor bars (or conductor sheets) are manufactured with a suitable process, such as machining, protrusion, casting, cutting or molding. A suitable coating layer may be applied to cover desired areas or the total surface of the conductor through various processes such as depositing, plating, printing, taping, oxidization etc. Then the pre-manufactured conductor bars are inserted into the core of motor (either the stator or the rotor) in step 1404. After this, one or more premanufactured connection rings (end rings) are assembled with the conductor bars. The connection rings may be manufactured with a suitable process, such as machining, protrusion, casting, cutting, or molding. A suitable coating layer may be applied to cover desired areas or the total surface of the connection rings through various processes such as depositing, plating, printing, taping, oxidization etc. If multiple connection rings are used, they may be installed one by one, or together in this step 1406. After this step, if separate locking devices are used in the design, the locking devices should be inserted between the connection ring and the conductors as step 1408. After this step, a soldering step is used to attach the conductors to the connection rings. During, prior to or after this step, if there is a need the conductors may also be soldered to the slots to strength the attachment of the conductors to the slots. Various sub-steps may be included in this soldering step 1410, such as cleaning and pre-warming, and various soldering process may be used, including reflowing, bathing, immersing, hand soldering, laser soldering etc.

Figure 15:
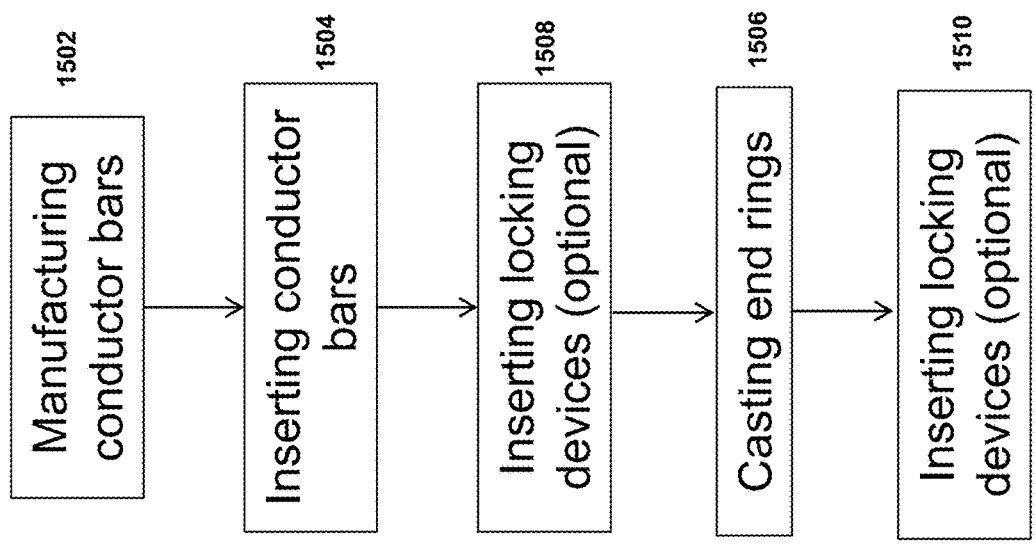
FIG. 15 illustrates a simplified manufacturing process of casting a connection ring around a plurality of conductors in accordance with various embodiments of the present disclosure.

FIG. 15 illustrates another manufacturing process in accordance with various embodiments of the present disclosure. The method in FIG. 15 is similar to the one shown in FIG. 14, with the difference being that the connection rings in FIG. 15 is formed by a casting or molding process in step 1506, when the interconnection between the connection ring and the conductor bars is formed at the same time. The coating of conductor bars should be able to withstand the heat during the casting (molding) process. During casting/molding process, molten metal may be allowed to enter the space between conductors and slots to strength the attachment between the conductors and the slots. For example, the conductors and the slots may be configured to create a space to allow molten metal to enter.

It should be noted that the step of inserting the locking devices may be moved to after the soldering step or the casting (molding) step, if the locking devices are designed to be able to penetrate or cut through the conductor material and the connection ring material. The connector bars and the connection rings may have pre-formed opening to allow the locking devices to be inserted (attached) more easily. There may be other variations in the manufacturing process, which should not unduly limit the scope of the claims. One of ordinary skill in the art would recognize many variations, alternatives, and modifications. For example, the process of casting the end rings may also be used to casting a suitable material such as aluminum into the spaces between the conductors and the walls of the slots in the core.

Furthermore, if an end ring is pre-manufactured with copper, the conductors may be made of aluminum and attached to the end ring through casting in a single step. Locking devices may also be used to strengthen the mechanical connection (attachment) between the conductors and the end ring. Suitable interface material may be coated onto the end ring to avoid metallic reaction between copper and aluminum.

Figure 16:
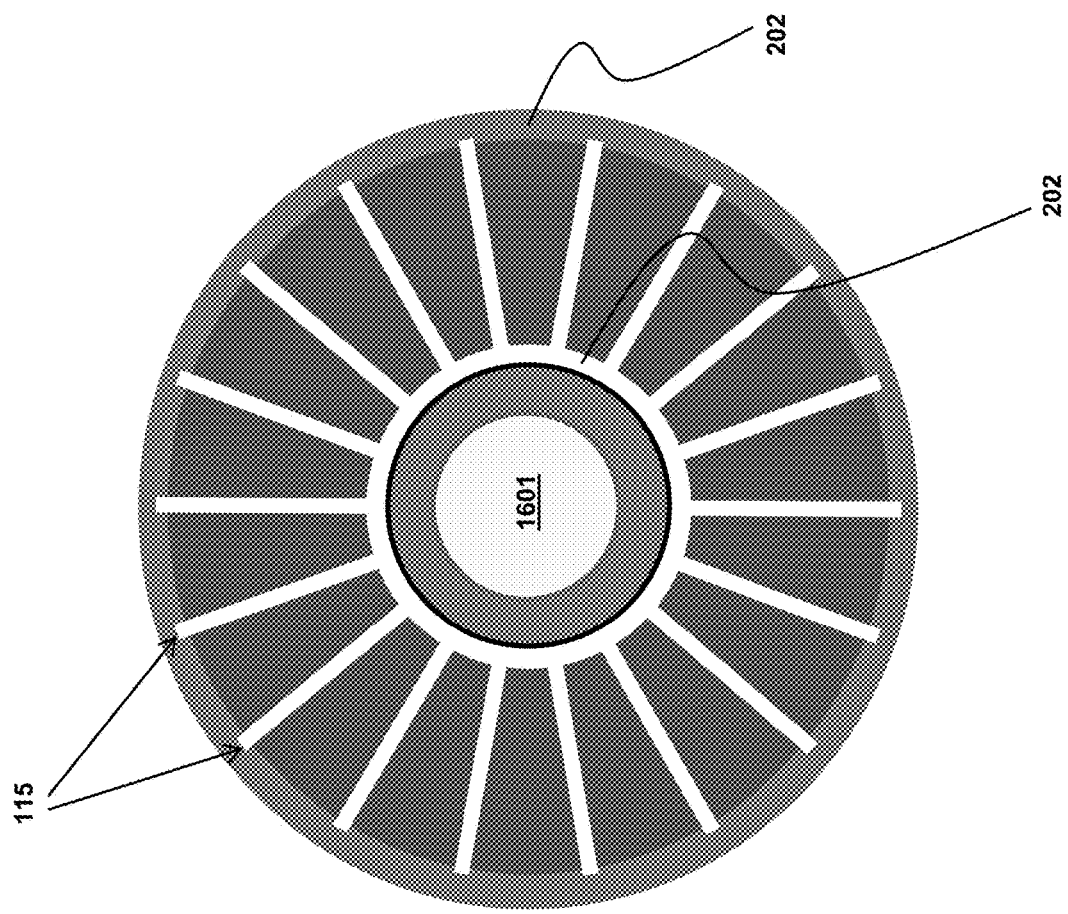
FIG. 16 illustrates a simplified view of an axial field stator or rotor in accordance with various embodiments of the present disclosure.

So far the discussion has been focused on radial flux machines. The innovative aspects in the present disclosure are also applicable to axial flux or hybrid machines. FIG. 16 illustrates a side view of a rotor of an axial flux induction machine (AFIM) in accordance with various embodiments of the present disclosure. The AFIM further comprises a shaft 1601, conductors 115, an inner end ring and outer end ring, with both end rings labeled 202. The design, fabrication and attachment of the conductors and end rings are all similar to what have been discussed above for the radial motors. Of course, the same technic can be used for other types of rotors and also stators in an axial flux motor.

Although the discussion above is generally based on motors, the techniques can be applied to generators and other machines, as a reliable and low cost interconnection of conductors and end rings (connection bars) is important in any machines.

The discussion above is generally based on machines with cores and slots. However, the various embodiments of the present disclosure can be applied to machines without cores (air-core machines) and/or without slots (slot-less machines). In a slot-less machine, the conductors or conductor assemblies are evenly distributed along a perimeter in a machine as if there were evenly distributed slots, so the winding arrangements discussed in the present disclosure can still be used.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A device comprising:
a stator or a rotor configured to be magnetically coupled through an air gap;
a plurality of slots distributed along a perimeter of the stator or rotor;
a plurality of metal bars, each placed into one of the plurality of slots; and
an end ring having a plurality of openings, wherein each opening is configured to receive an end of one of the metal bars, and wherein a lock feature is configured to improve a mechanical attachment between the end ring and the said metal bar, and wherein the lock feature is configured to maintain a separation between the metal bar and an inner surface of a corresponding opening in the end ring, thereby preventing undesirable interaction between the metal bar and the end ring.

2. The device of claim 1, wherein:
the said metal bar is made of a different material from the end ring.

3. The device of claim 2, wherein:
the said metal bar is made of copper, and the end ring is made of aluminum.

4. The device of claim 2, wherein:
one between the said metal bar and the end ring is made of copper, and the other is made of aluminum, and an interface material is configured to exist between the said metal bar and the wall of the opening accommodating the said metal bar to prevent metallic action between the said metal bar and the end ring.

5. The device of claim 1, wherein:
one of the metal bars and the slot accommodating it are configured to have an attachment feature to improve the attachment of the metal bar to the slot.

6. The device of claim 1, wherein:
the end ring is made of copper, and the metal bars are manufactured through a process step of casting aluminum into the plurality of slots, and wherein during the process step of casting aluminum the metal bars are attached mechanically to the end ring by the aluminum material.

7. A method comprising:
configuring a stator or rotor to be magnetically coupled through an air gap;
placing a plurality of slots distributed along a perimeter of the stator or rotor;
inserting a plurality of metal bars into the plurality of slots; and
configuring an end ring having plurality of openings, wherein each opening is configured to receive an end of one of the metal bars, and wherein a lock feature is configured to improve a mechanical attachment between the end ring and the said metal bar, and wherein the lock feature is configured to maintain a separation between the metal bar and an inner surface of a corresponding opening in the end ring, thereby preventing undesirable interaction between the metal bar and the end ring.

8. The method of claim 7, wherein:
the said metal bar is made of a different material from the end ring.

9. The method of claim 8, wherein:
the said metal bar is made of copper, and the end ring is made of aluminum.

10. The method of claim 8, further comprising:
placing an interface material between the said metal bar and the end ring.

11. The method of claim 8, wherein:
the end ring is manufactured by casting a metal material around the plurality of metal bars.

12. An apparatus comprising:
a stator magnetically coupled to a rotor through an air gap;
a plurality of slots distributed along a perimeter of the apparatus and configured to accommodate a plurality of conductors, wherein each of the slots is configured to accommodate one of the conductors; and
an end ring having a plurality of openings, wherein each opening is configured to receive an end of one of the conductors, and wherein a lock feature is configured to improve a mechanical attachment between the end ring and the said conductor, and wherein the lock feature is configured to maintain a separation between the metal bar and an inner surface of a corresponding opening in the end ring, such that the metal bar is positioned approximately in the middle of the corresponding opening, thereby preventing undesirable interaction between the metal bar and the end ring.

13. The apparatus of claim 12, wherein:
the said conductor is made of a different material from the end ring.

14. The apparatus of claim 13, wherein:
the said metal bar is made of copper, and the end ring is made of aluminum.

15. The apparatus of claim 13, wherein:
one between the said conductor and the end ring is made of copper, and the other is made of aluminum, and an interface material is configured to exist between the said conductor and the wall of the opening accommodating the said conductor to prevent metallic action between the said conductor and the end ring.

16. The apparatus of claim 13, wherein:
the end ring is made of copper, and the plurality of conductors is manufactured through a process step of casting aluminum into the plurality of slots, and wherein during the process step of casting aluminum the plurality of conductors are attached mechanically to the end ring by the aluminum material.

17. The apparatus of claim 13, wherein:
the plurality of conductors is copper bars, and the end ring is manufactured through a process step of casting aluminum around the copper bars, and during the process step of casting aluminum, molten aluminum enters a space between the plurality of slots and the copper bars to strengthen an attachment between the plurality of slots and the copper bars.

18. The apparatus of claim 12, wherein:
one of the plurality of conductors and the slot accommodating it are configured to have an attachment feature to improve the attachment of the conductor to the slot.

19. The apparatus of claim 18, wherein:
the attachment feature includes a cut out on a wall of the slot.

20. The apparatus of claim 18, wherein:
the attachment feature includes a protrusion on the conductor.

* * * * *